United States Patent
Eden

(10) Patent No.: US 10,750,208 B2
(45) Date of Patent: Aug. 18, 2020

(54) PROCESSING VIDEO AND AUDIO STREAMING DATA

(71) Applicant: Gideon Eden, Lexington, MA (US)

(72) Inventor: Gideon Eden, Lexington, MA (US)

( * ) Notice: Subject to any disclaimer, the term of this patent is extended or adjusted under 35 U.S.C. 154(b) by 0 days.

(21) Appl. No.: 16/234,560

(22) Filed: Dec. 28, 2018

(65) Prior Publication Data

US 2020/0213629 A1    Jul. 2, 2020

(51) Int. Cl.
| | | |
|---|---|---|
| *H04N 7/173* | (2011.01) | |
| *H04N 21/2187* | (2011.01) | |
| *H04N 21/233* | (2011.01) | |
| *H04N 21/242* | (2011.01) | |
| *H04N 21/61* | (2011.01) | |
| *H04N 21/234* | (2011.01) | |

(52) U.S. Cl.
CPC ....... *H04N 21/2187* (2013.01); *H04N 21/233* (2013.01); *H04N 21/23406* (2013.01); *H04N 21/242* (2013.01); *H04N 21/6125* (2013.01)

(58) Field of Classification Search
CPC ............. H04N 21/2187; H04N 21/233; H04N 21/23406; H04N 21/242; H04N 21/6125
See application file for complete search history.

(56) References Cited

U.S. PATENT DOCUMENTS 10,469,880 B1 * 11/2019 Kravis ............... H04N 21/8547
2015/0092106 A1 * 4/2015 Savare ............... H04N 21/8358
348/512

* cited by examiner

*Primary Examiner* — Mulugeta Mengesha

(57) ABSTRACT

The disclosure includes a method of generating and presenting digital streaming data to a viewer. The digital streaming data comprises streaming video data depicted from a live event and streaming audio data generated by a commentator, the streaming audio data related to the live event. In many embodiments, the method includes presenting the streaming video data to the commentator and the viewer and generating streaming audio data by the commentator related to the live event. Methods may also include transferring the streaming audio data via an Internet to the viewer and providing the viewer with synchronization means to synchronize the streaming video data with the streaming audio data.

20 Claims, 7 Drawing Sheets

PROCESSING VIDEO AND AUDIO STREAMING DATA

BACKGROUND

Field

Various embodiments disclosed herein relate to processing video and audio streaming data.

Description of Related Art

Traditional commercial television broadcasting provides viewers with content composed of both video streaming data and audio streaming data. Live events constitute a widely broadcasted portion of television programming, including news, political events, sporting events, parades, concerts, and the like. Live events are often accompanied by audio data along with the video data, such as direct audio recordings from the events, and commentary generated by television broadcasting personnel. As television communication grows internationally, viewers are able to watch live events that originate from all over the world. However, the accompanying audio may not always be desirable to the viewer, or meet the viewer's expectations. If a viewer wishes to view a news station or local event of a foreign country, translation may be necessary, but not always offered by the television broadcasting providers. While live events, such as a parade or concert, may be accompanied by audio commentary, a viewer may wish to hear the observations of a person participating in the festivities. As well, a viewer watching a sporting event may be more interested in commentary from a local fan community than the commentary provided by the broadcasting television station. Such fans may resort to listening to local radio stations while watching the event in order to obtain the information they desire. With this solution, as the audio data and the video data are transferred via various independent communication channels, there is usually an inherent delay between the streaming of the audio data and the video data.

The operation of communication satellites and the digital processing mechanisms in servers, which may be different paths for the commentator and the viewer, often results in a non-synchronized video and audio data presentation. Thus, there is a need for a more effective way to synchronize audio data and video data received from different communication channels in order to provide alignment between the video streaming data and the audio streaming data.

SUMMARY

The disclosure describes a method of generating and presenting digital streaming data to a viewer or to a group of viewers. The digital streaming data may comprise streaming video data depicted from a live event and streaming audio data generated by a commentator. The streaming audio data may be related to the live event.

Methods of generating and presenting digital streaming data may include presenting the streaming video data to the commentator and the viewer. A video presentation timing to the commentator may differ from a video presentation timing to the viewer. Methods may also include generating streaming audio data related to the live event. As well, methods may include transferring the streaming audio data via an Internet to the viewer. An audio presentation timing to the commentator may differ from an audio presentation timing to the viewer. Furthermore, methods may include providing each of the viewers with synchronization means to synchronize the streaming video data with the streaming audio data.

The synchronization means may include at least one of electronic circuitry that may delay an introduction of the streaming audio data received by the viewer, a software delay that may delay the introduction of the streaming audio data received by the viewer, and a video controlled buffer that may delay the introduction of the streaming video data to the viewer. The video controlled buffer may comprise electronic memory that may be connected between a television data channel that may provide the streaming video data and a commercial television unit. The video controlled buffer may provide the viewer with a capability to interactively delay the streaming video data to the commercial television unit. The streaming video data may be delayed by the viewer selectively stopping and restarting the flow of the streaming video data at different times until the streaming video data and the streaming audio data are substantially synchronized.

In some embodiments, methods may include transferring the streaming audio data via the Internet. The transferring may be carried out via a web site to which both the commentator and the viewer are logged in. The streaming audio data may be received by the viewer by at least one of a mainframe computer, a personal computer, a tablet, and a smart phone.

In several embodiments, the video controlled buffer may comprise a software buffering program. The software buffering program may be embedded in a processor that may receive the streaming video data from a television channel, and provide a time delayed video signal controlled by the viewer, and present delayed video data to a display unit of the processor. In some embodiments, the processor may also be used to delay the audio data. The processor may comprise at least one of a mainframe computer, a desktop personal computer, a laptop personal computer, a tablet, and a smart phone.

Methods may include the viewer receiving the streaming audio data and the streaming video data. The streaming audio data received by the user may precede the streaming audio data received by the user. The viewer may interactively delay the presentation of the streaming audio data by incrementing the delay time until synchronization is achieved.

Methods may further include the viewer receiving the streaming audio data and the streaming video data. The streaming video data received by the user may precede the streaming audio data received by the user. The viewer may interactively delay the presentation of the streaming video data by incrementing the delay time until synchronization is achieved.

In some embodiments, the streaming video data received by the viewer may precede the streaming audio data received by the viewer. Methods may also include the viewer applying a first step in which the streaming video data is delayed sufficiently to cause the streaming audio data to precede the streaming video data. Methods may further include the viewer applying a secondary step of delaying the audio data according to fine tune the desired synchronization.

In some embodiments, the system may enable the viewers to communicate with the commentator and among themselves. The system may provide text message functionality related to the live event via the Internet. The viewers may communicate with the commentator regarding the live event via the web site.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
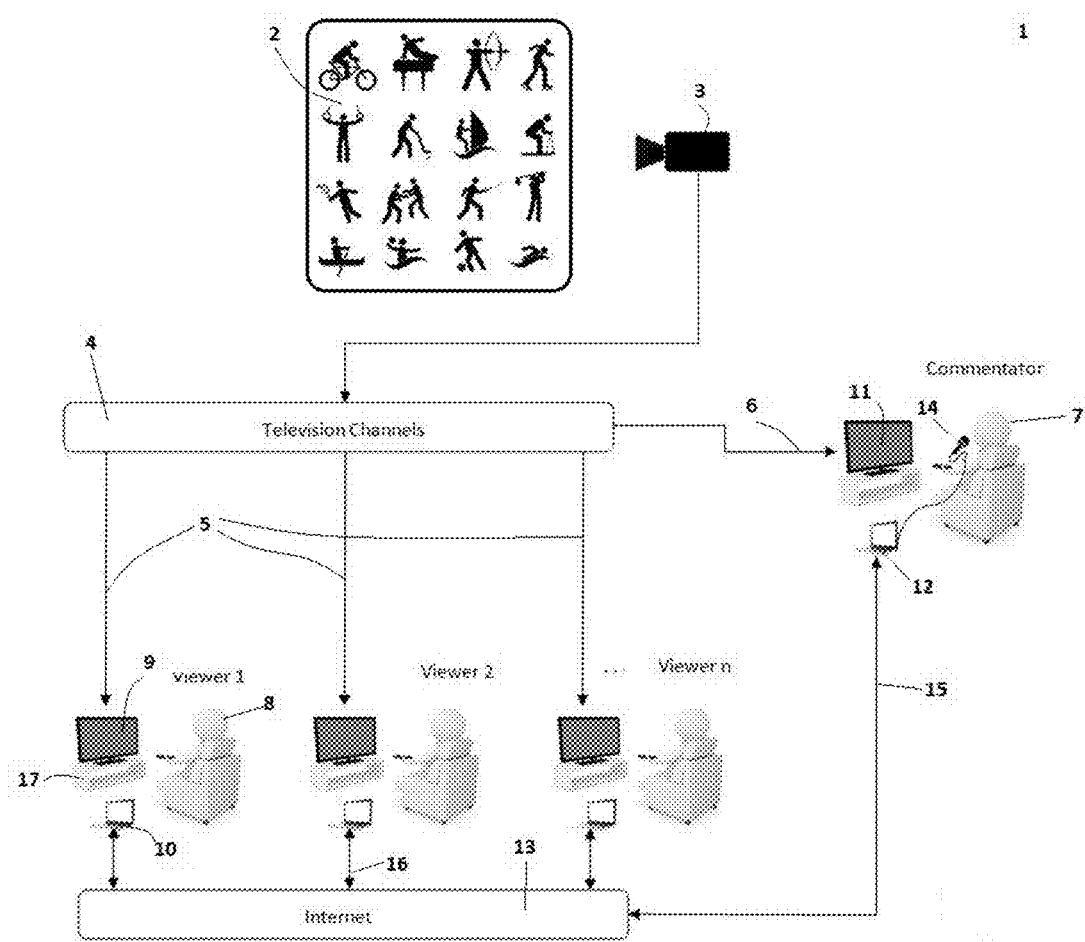
FIG. 1 illustrates a schematic of a method of using a data streaming system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Synchronization Embodiments

Commercial television broadcasting provides viewers with TV programs composed of video and audio streaming data. Live events such as news, political events and sport events make up a class of widely broadcasted television programming. The broadcasting stations typically provide audio data along with the video data. The audio data often include direct audio recordings from the live events and commentary generated by TV broadcasting personnel related to the live events. With the enormous growth of international television communications, many viewers watch live events transmitted via satellites in real time. With this global broadcasting, viewers can only listen to the audio information provided by the broadcasting personnel, which may not fulfill the viewers' expectations. For example, international news can be viewed in many countries, not all of which speak the language of the broadcasting station. Thus, online translation of speech may be desired for foreign viewers, as well as local commentary relating to live events. As well, live sporting events only offer the commentary of the TV broadcasting station, while local fans are often more interested in commentary of their close fan community rather than that of the station. Such fans sometimes resort to listening to local broadcasting radio station while watching the live TV broadcast program in order to obtain the information and commentary they desire.

In the method of the current invention, an additional audio channel may be generated by a commentator while watching a live event on a television monitor linked to a commercial television channel. The commentator may create audio data by recording vocal commentary in real time while watching the event. Such audio data may be transferred via the Internet to multiple viewers. Each viewer may watch the live event via a television monitor while listening to the audio data of the desired commentator via the Internet.

However, the implementation of the proposed method is by no means trivial. The major difficulty lies in the presence of inherent delays between the video data and audio data in transferring the data via different communication channels. Operations of communication satellites, as well as digital processing mechanisms in servers (which may be different for the commentator and each of the viewers), usually result in non-synchronized video and audio data presentation. Consequently, there is a need for synchronization means at each viewer station that will provide synchronization of the video streaming data and the audio streaming data, whether the audio data precedes the video data, or the video data precedes the audio data.

FIG. 1 illustrates an embodiment of the present invention. A system 1 may incorporate streaming video data depicted from a live scene 2 generated by a television camera 3, such as a commercial broadcasting apparatus. A combined streaming video and streaming audio data may be distributed via numerous television channels 4 and distribution lines 5 to viewers that may watch the live event on commercial television monitors 9. The channels and distribution lines that communicate the live event may be quite complicated and may include satellites, optical and electrical transmission lines, digital processors, etc. Consequently, different viewers nationwide and internationally may not receive the combined streaming data at the same instance, as each channel may have differing intrinsic delays. These delays are not typically significant enough to prevent the perception of "real time" coverage (unless the viewer simultaneously views the video data via a television channel and listens to radio broadcasting of the live event, which may be received ahead of the video data). In FIG. 1, the viewers 8 include numerous viewers (viewer1, viewer2, . . . , viewerN), each of whom may receive the streaming combined video and audio data each with differing delay times, which can vary up to tens of seconds apart. The same combined video/audio data may also presented in real time to a designated commentator 7 via a distribution line 6 and presented on a screen monitor 11. The channel 6 may also have an inherent delay different than each of the distribution line 5.

In the several embodiments, vocal comments may be generated in real time by the commentator 7 watching the live event 2 on the television monitor 11. As the event progresses, the commentator 7 may record vocal comments with the aid of a microphone 14. An audio signal of the comments may be transmitted in real time to a processor 12, which may be linked to an Internet 13 via a channel 15. The processor may be any device that may be connected to the internet capable of transferring digital data, such as a main frame computer, a desktop computer, laptop computer, tablet, smart phone, and the like. Each of the viewers 8 may have a viewer processor 10 linked to the Internet via Internet channels 16, such as an Ethernet cable and a Wi-Fi connection. The processor may be capable of delivering the vocal commentary generated by the commentator 7 in real time to each of the viewers.

Due to the different inherent delay times of the video channels, the audio commentary received by each of the individual viewers may at least one of precede and lag behind the video signal presented on the television monitor. Even a small time difference (such as a single second) may be unacceptable to a viewer. However, it is not impossible to have delays of tens of seconds, which makes watching video data from one source and listening to audio data from a separate source a frustrating endeavor and renders systems that provide general synchronization of audio data with video data according to timing of the live event useless.

In order to overcome such synchronization issues, two additional delay mechanisms are implemented in the system. The first mechanism may be a system that may be a video delay means 17. The video delay means 17 may receive streaming video data from the television channel 5 and provide delayed streaming data to the television monitor 9. Such video delay means may comprise a memory buffer on which the viewer may store the streaming video data, and release the data to the monitor after a specific delay time. Internally, the streaming data may be temporarily stored in a storage device, such as memory (RAM), disk drive, hard drive, and the like. However, such a mechanism may be implemented when the video data precedes the audio data. Additionally, while this device may provide video delay functionality, inherently low resolution incremental delay time units may deter the system. High resolution incremental delays (10-100 milliseconds) that precise synchronization may require are generally difficult to generate.

In some embodiments, the audio data may precede the video data. As such, the system may provide audio delay means. The audio data may be delayed by utilizing a software module in the viewer's processor 10. The software module may generate an audio data delay in high resolution increments (10-100 milliseconds) until synchronization is achieved.

Figure 2:
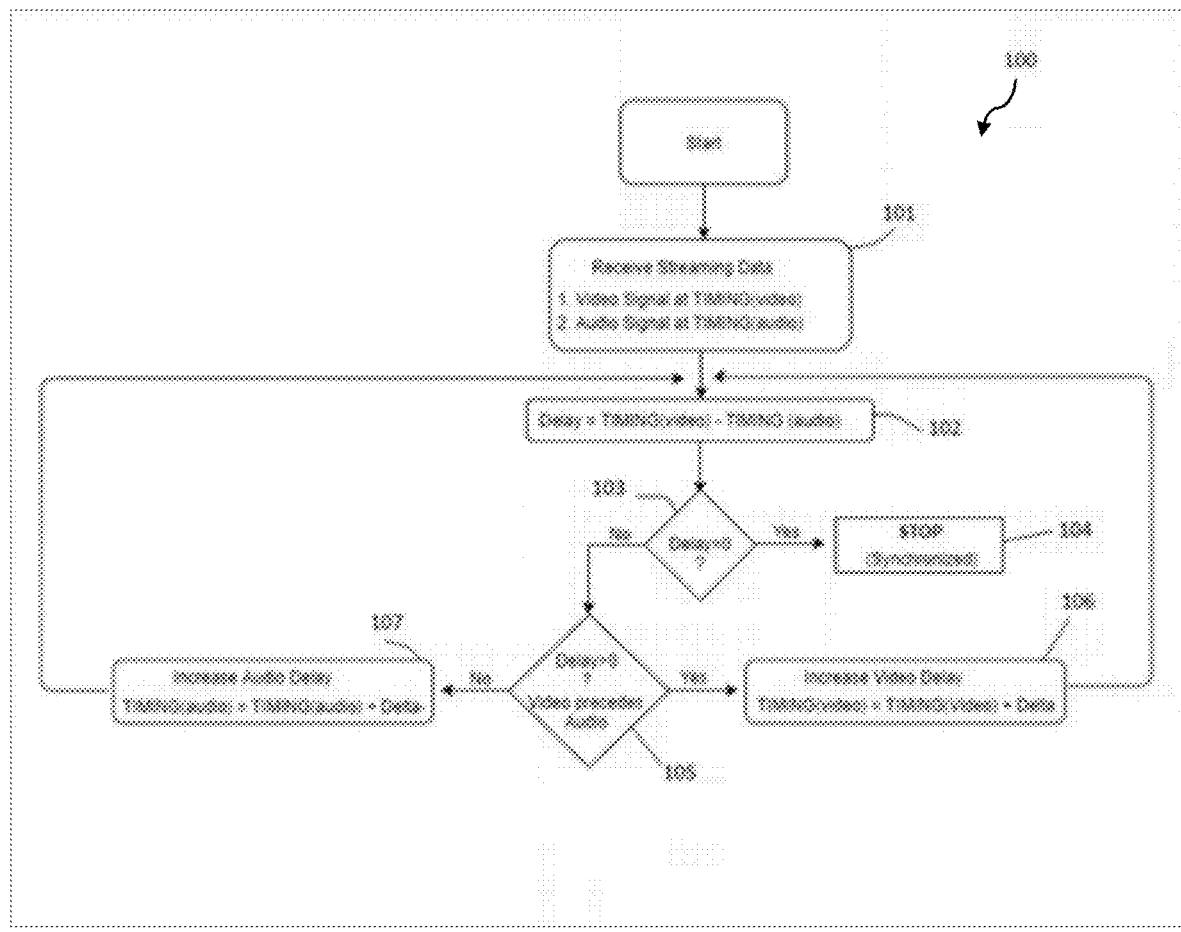
FIG. 2 illustrates a flowchart of a method of using a data streaming system, according to some embodiments.

FIG. 2 illustrates a flow chart of process 100 that may be utilized to obtain synchronization. The video data and the audio data may be received by a view at different times, as show in block 101. The timing of the video data may be described as TIMING(video) and the timing of the audio data may be described as TIMING(audio). Block 102 shows a calculation that may be implemented to find the difference between the timing of the video data and the timing of the audio data.

In some instances, the delay may be zero, indicating that a delay between the video data and the audio data does not exist and thus the audio data and the video data are synchronized. In some instances, a delay may exist and the process 100 may determine which signal precedes the other, as shown in block 105. A positive delay time may be determined when the video data precedes the audio data. In response, an incremental delay Delta may be generated by the video delay means, as indicated by block 106. When the video data has been delayed, the delay time is recalculated at block 102. The delay may then be calculated to be zero, meaning that the audio data and the video data are synchronized and no further action is required. In some instances, the process 100 may determine that the audio data precedes the video data, as shown at block 107. In response, a small incremental time Delta is be generated by the audio delay means.

In several embodiments, the system 1 may provide communication between each of the viewers 8 and the commentator 7 during the duration of the live event 2. As shown in FIG. 1, the communication lines 15 and 16 can be bi-directional enabling each viewer to provide feedback to the commentator via the Internet 13. For example, the user 18 can generate text messages on the computer 10 which may appear in real time upon the computer screen 12 of the commentator, as well as upon each of the viewer's computer screen 10.

Method Embodiments

The disclosure also includes methods of generating and presenting digital streaming data to a viewer or a group of viewers. The digital streaming data may comprise streaming video data depicted from a live event and streaming audio data generated by a commentator. It should be appreciated that the streaming audio data may be related to the live event.

Figure 3:
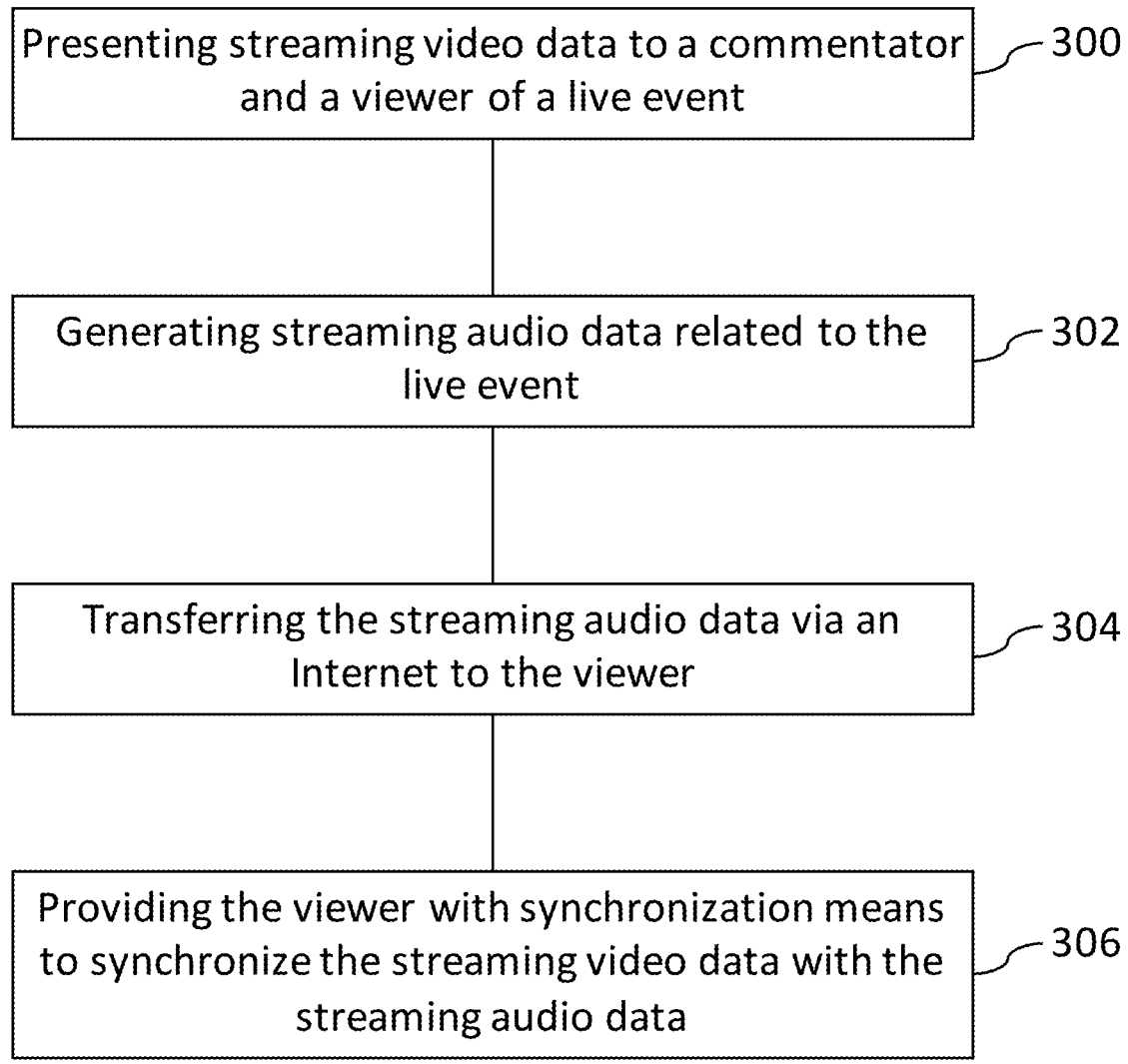
FIG. 3 illustrates a flowchart of a method of using a data streaming system, according to some embodiments.

As shown in FIG. 3, methods may include presenting the streaming video data to the commentator and the viewer (at step 300). A video presentation timing to the commentator may differ from a video presentation timing to the viewer. The timing of video presentation may differ based on a variety of factors, such as the geographical location of the viewer and the commentator. For example, a commentator may be located in a city where the live event is taking place, and a viewer may be located in a city across a country from the city in which the live event is taking place. As such, inherent delays in broadcasting the live event may take place with the viewer relative to the commentator.

In some embodiments, methods may include generating streaming audio data related to the live event (at step 302). The commentator may generate the streaming audio data. The streaming audio data may comprise vocal commentary, which may be related to the live event, participants in the live event, location of the live event, and the like. Such vocal commentary may be desirable to viewers who want a particular perspective of the live event that may be offered by the commentator. For example, the live event may comprise a local college basketball game. Video broadcasting of the basketball game may include vocal commentary relating to the game, but viewers may desire commentary relating to the players, such as the status of players, how a player's skill level has improved, a player's background, and referee's decisions.

With added reference to FIG. 3, methods may further include transferring the streaming audio data via an Internet to the viewer (at step 304). An audio presentation timing to the commentator may differ from an audio presentation timing to the viewer. As the commentator transfers the audio data, inherent delays in presentation to the viewer may occur based on a variety of factors, such as location, internet speed, audio data streaming source and the internet servers. For example, the viewer may have a slow Internet communication speed, which may thus prevent the audio data from being presented to the viewer at the same time that the commentator is transferring the audio data. Methods may also include providing the viewer with synchronization means to synchronize the streaming video data with the streaming audio data (at step 306).

In some embodiments, the synchronization means may comprise at least one of electronic circuitry that may delay an introduction of the streaming audio data received by the viewer, a software delay that may delay the introduction of the streaming audio data received by the viewer, and a video controlled buffer that may delay an introduction of the streaming video data to the viewer. The video controlled buffer may include electronic memory that may be connected between a television data channel that provides the streaming video data and a commercial television unit.

Figure 4:
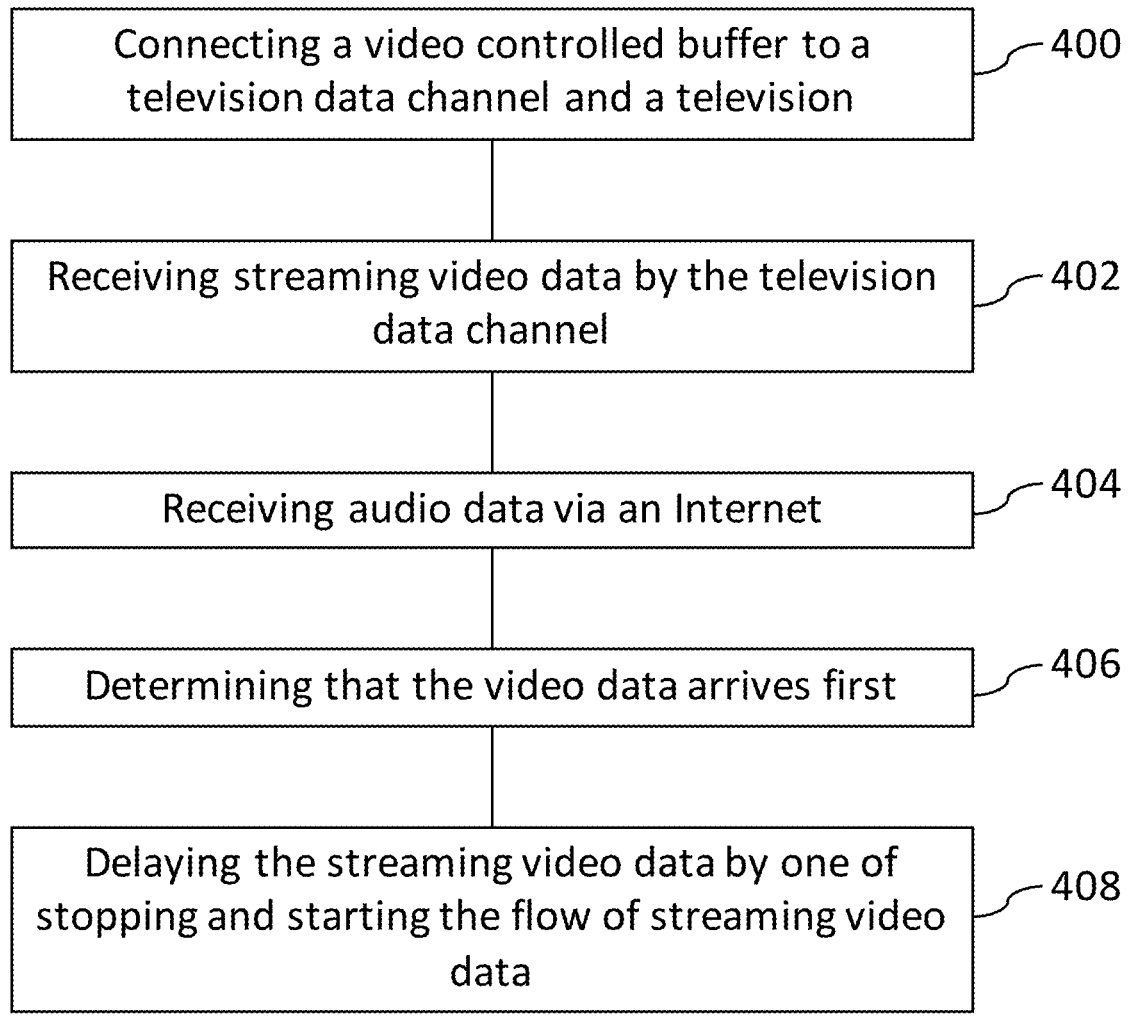
FIG. 4 illustrates a flowchart of a method of using a data streaming system, according to some embodiments.

Referring now to FIG. 4, methods of generating and presenting digital streaming data to a viewer may include connecting the video controlled buffer to the television data channel and the commercial television unit (at step 400). The video controlled buffer may provide the viewer with the capability to delay the streaming video data to the commercial television unit.

Methods may also include receiving streaming video data by the television data channel (at step 402). As well, methods may include receiving audio data via an Internet (at step 404). The viewer may receive the streaming video data and the audio data. However, the timing of the video data and the timing of the audio data may differ. As such, methods of utilizing the video controlled buffer may further include determining that the video data arrives before the audio data (at step 406). In response, methods may include delaying the video data by stopping and starting the flow of the streaming video data (at step 408). The video controlled buffer may receive streaming video data from the commercial television unit and provide delayed streaming data to a monitor of the television. The video controlled buffer may comprise a memory buffer in which a viewer may store the streaming video data and release the data to the television monitor after a specific delay time. The video data may be temporarily stored in a storage device (e.g., RAM, disk drive) until the video data and the audio data are substantially synchronized. The viewer may selectively stop and restart the flow of the streaming video data at different times until the streaming video data and the streaming audio data are substantially synchronized.

Figure 5:
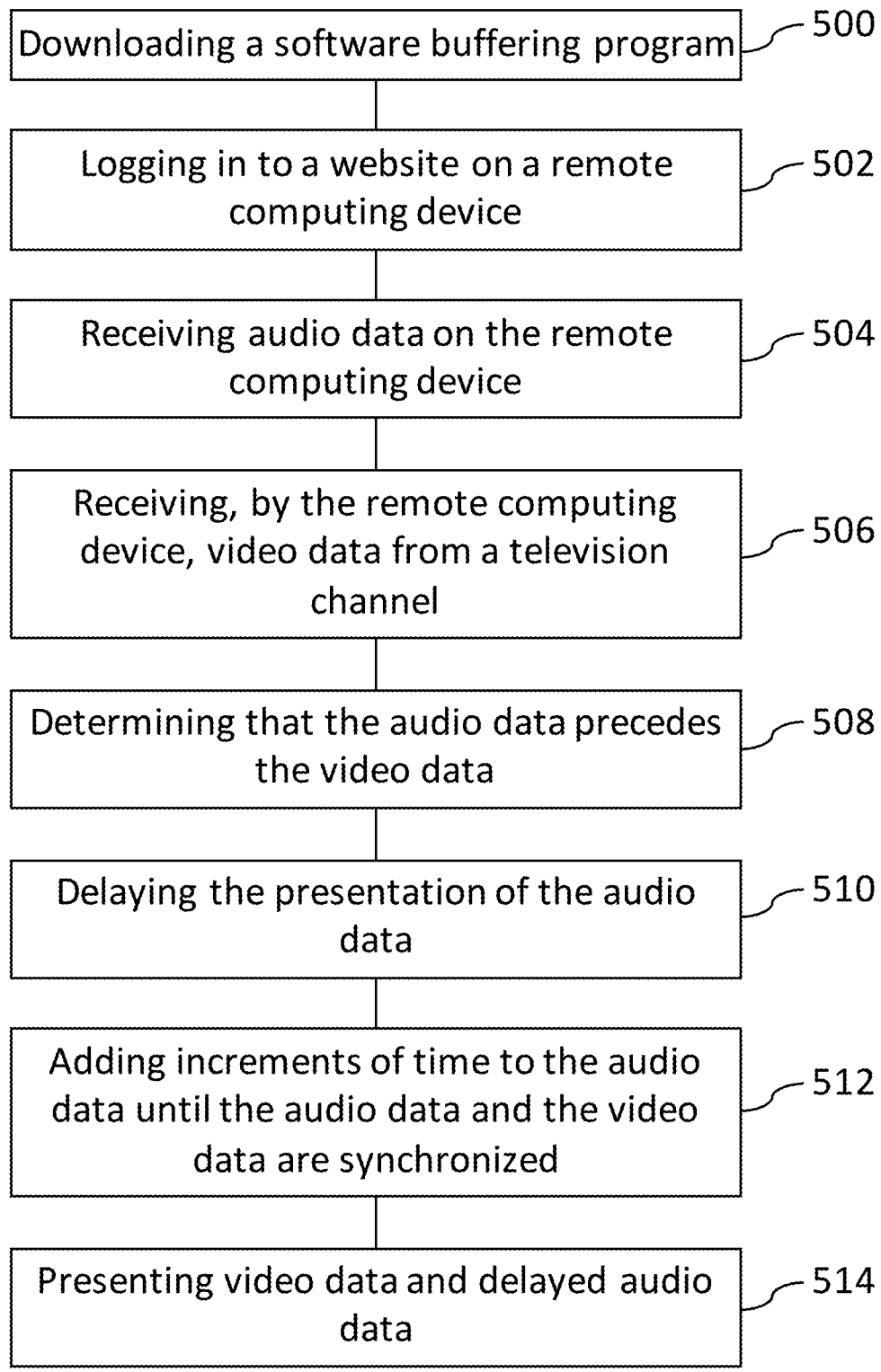
FIG. 5 illustrates a flowchart of a method of using a data streaming system, according to some embodiments.

With reference to FIG. 5, methods may include downloading or executing a software audio buffering program (at step 500). The software buffering program may be downloaded to a remote computing device of the viewer. The remote computing device may include at least one of a laptop computer, desktop computer, tablet, smart phone, and the like.

In some embodiments, methods may include logging in to a web site on the remote computing device (at step 502). At least one viewer and the commentator may log in to the website. The commentator may generate the audio data and transfer the audio data via the Internet. The transfer of the audio data from the commentator to the viewer may be carried out via the website. In some embodiments, the website may enable the viewer to communicate with the commentator. Communication may be achieved by providing text message functionality via the Internet. Methods may also include receiving the audio data on the remote computing device (at step 504). The viewer may present the audio data via the website that the viewer may be logged in to on the speaker of the remote computing device.

In some embodiments, methods may include receiving, by the remote computing device, the video data from the television channel (at step 506). The software buffering program of the remote computing device may receive the streaming video data from the television channel. The software buffering program may provide a time delay that may be controlled by the viewer. As such, methods may include determining that the audio video data precedes the video data (at step 508).

With added reference to FIG. 5, methods may include delaying the presentation of the audio video data (at step 510). The viewer may interactively delay the presentation of the streaming audio data. Methods may further include adding increments of time to the audio data until the audio data and the video data are synchronized (at step 512). Finally, methods may include presenting the video data and the delayed audio data (at step 514). The video data and the delayed audio data may be presented to the viewer by the remote computing device. In some embodiments, the video data may be presented by the commercial television unit and the delayed audio data may be presented by the remote computing device. It should be appreciated that the video data and the delayed audio data may be presented to the viewer via different devices or a single device.

Figure 6:
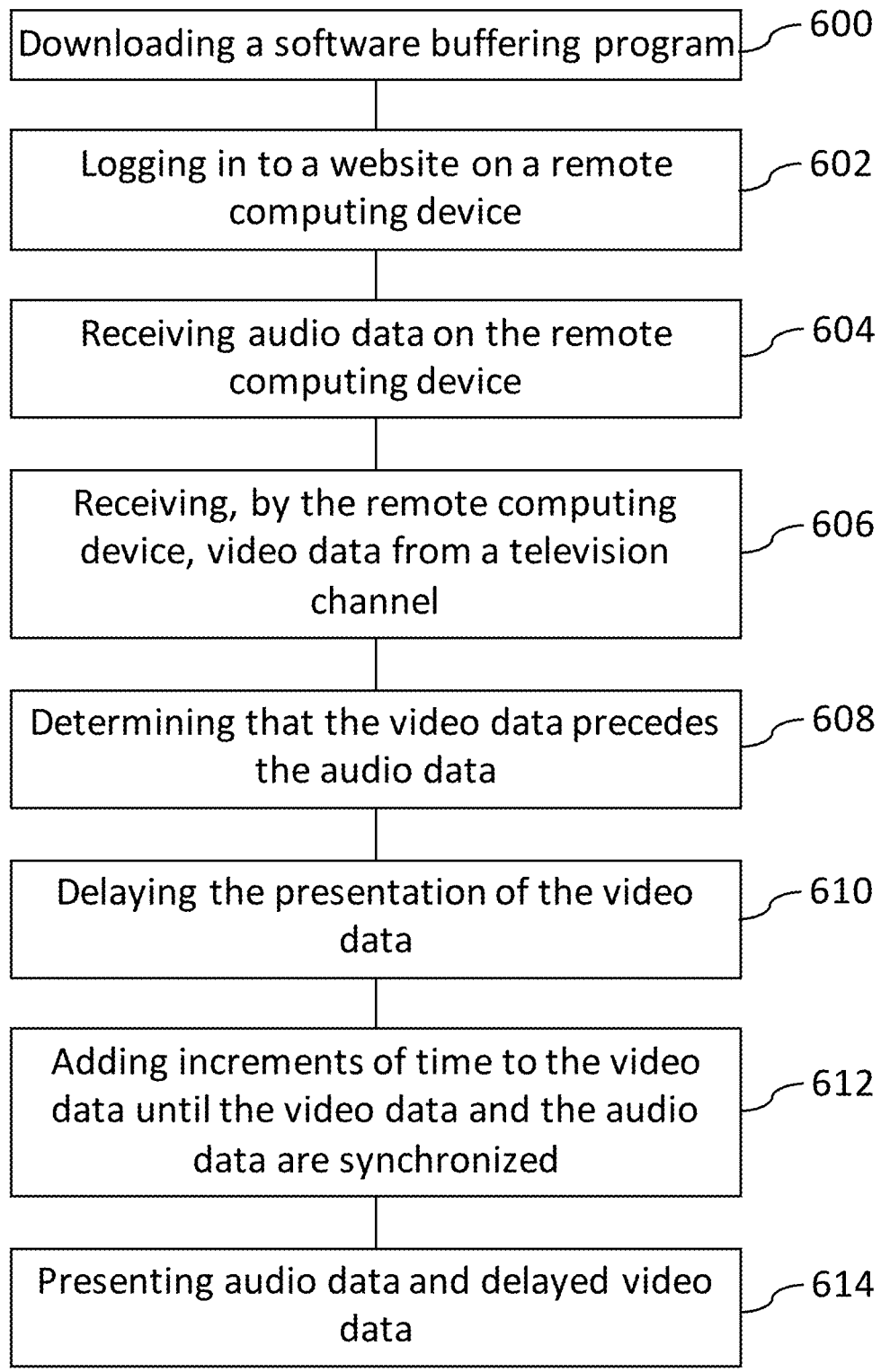
FIG. 6 illustrates a flowchart of a method of using a data streaming system, according to some embodiments.

As shown in FIG. 6, methods may include downloading the software buffering program (at step 600). The video controlled buffer may comprise the software buffering program. The software buffering program may be downloaded to the remote computing device of the viewer.

In some embodiments, methods may include logging in to the website on the remote computing device (at step 602). At least one viewer and the commentator may log in to the website. The audio data may be transferred from the commentator to the viewer via the Internet, and may be carried out by the website. As such, methods may include receiving the audio data on the remote computing device (at step 604). The viewer may receive the audio data by presenting the audio data via the website on a speaker linked to the remote computing device.

In some embodiments, methods may include receiving, by the remote computing device, the video data from the television channel (at step 606). The software buffering program may receive the streaming video data from the television channel. The software buffering program may provide a time delay controlled by the viewer. Methods may thus also include determining that the video data precedes the audio data (at step 608).

With continued reference to FIG. 5, methods may include delaying the presentation of the video data (at step 610). The viewer may interactively delay the presentation of the streaming video data. Methods may further include adding increments of time to the video data until the video data and the audio data are synchronized (at step 612). Finally, methods may include presenting the audio data and the delayed video data (at step 614). The audio data and the delayed video data may be presented to the viewer by the remote computing device. In some embodiments, the delayed video data may be presented by the commercial television unit and the audio data may be presented by the remote computing device. It should be appreciated that the delayed video data and the audio data may be presented to the viewer via different devices or a single device.

Figure 7:
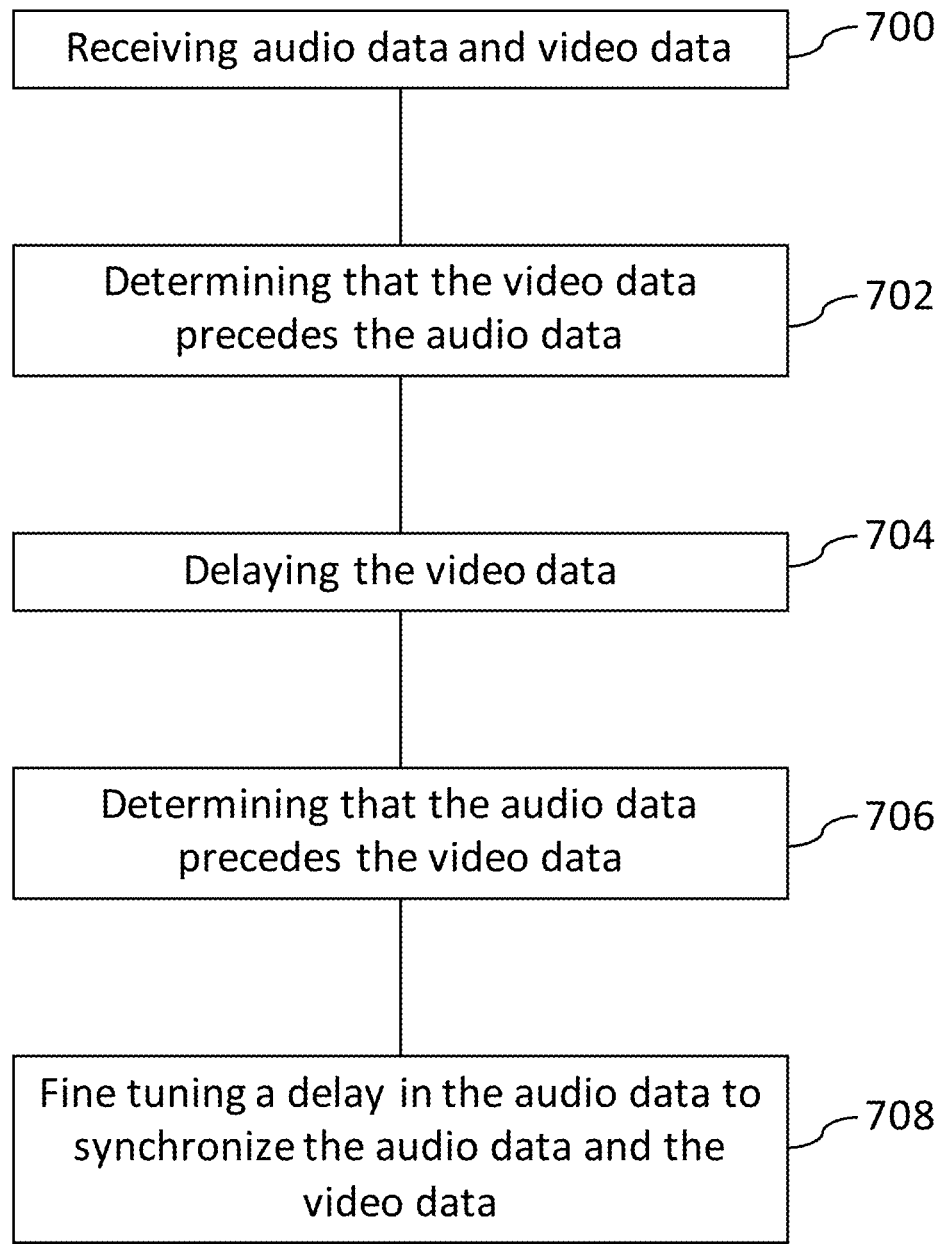
FIG. 7 illustrates a flowchart of a method of using a data streaming system, according to some embodiments.

Referring now to FIG. 7, methods may include receiving the audio data and the video data (at step 700). The audio data may be received by the viewer via the website. Methods may also include determining that the video data precedes the audio data (at step 702).

In some embodiments, methods may include delaying the video data (at step 704). The viewer may delay the video data by applying a first step of delaying the streaming video data. The viewer may delay the streaming video data until the video data is delayed sufficiently to cause the streaming audio data to precede the streaming video data. Methods may thus include determining that the audio data precedes the video data (at step 706). Methods may further include fine tuning a delay in the audio data to synchronize the audio data and the video data (at step 708). The audio data may thus be delayed according to fine tune to the desired synchronization.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of generating and presenting non-processed streaming audio data and non-processed streaming video data to a first viewer and a second viewer, the non-processed streaming video data comprising video data depicted from a live event, the non-processed streaming audio data comprising audio data related to the live event and generated by a commentator, the method comprising:

presenting, via a commercial television unit, the non-processed streaming video data to the commentator, the first viewer, and the second viewer, wherein a video presentation timing to the commentator may differ from the video presentation timing to at least one of the first viewer and the second viewer, and the video presentation timing to the first viewer may differ from the video presentation timing to the second viewer;

generating the non-processed streaming audio data related to the live event by the commentator;

transferring the non-processed streaming audio data via an Internet to the first viewer and the second viewer; and providing the first viewer and the second viewer with a capability to synchronize a video presentation time of the non-processed streaming video data with an audio presentation time of the non-processed streaming audio data, wherein the first viewer can directly synchronize the non-processed streaming video data and the non-processed streaming audio data via a first time, and the second viewer can directly synchronize the non-processed streaming video data and the non-processed streaming audio data via a second time that is different from the first time.

2. The method of claim 1, wherein the capability to synchronize comprises at least one of electronic circuitry that delays an introduction of the non-processed streaming audio data received by the first viewer and the second viewer, a software delay that delays the introduction of the non-processed streaming audio data received by the first viewer and the second viewer, and a video controlled buffer that delays an introduction of the non-processed streaming video data to the first viewer and the second viewer.

3. The method of claim 2, wherein the video controlled buffer comprises electronic memory connected between a commercial television channel that provides the non-processed streaming video data and the commercial television unit, thereby providing at least one of the first viewer and the second viewer with a capability to interactively delay the non-processed streaming video data to the commercial television unit, by selectively stopping and restarting a flow of the non-processed streaming video data at different times until the non-processed streaming video data and the non-processed streaming audio data are substantially synchronized.

4. The method of claim 1, wherein transferring the non-processed streaming audio data via the Internet is carried out via at least one web site to which both the commentator and at least one of the first viewer and the second viewer are logged in.

5. The method of claim 1, wherein the non-processed streaming audio data is received by at least one of the commentator, the first viewer and the second viewer by at least one of a mainframe computer, a desktop personal computer, a laptop personal computer a tablet, and a smart phone.

6. The method of claim 2, wherein the video controlled buffer comprises a software buffering program embedded in a processor that receives the non-processed streaming video data from a television channel, provides a time delay controlled by at least one of the first viewer and the second viewer, and presents delayed video data to a display unit linked to the processor.

7. The method of claim 6, wherein the processor is also used to delay the audio data.

8. The method of claim 7, wherein the processor is at least one of a mainframe computer, a desktop personal computer, a laptop personal computer, a tablet, and a smart phone.

9. The method of claim 2, wherein the non-processed streaming audio data received by at least one of the first viewer and the second viewer precedes the non-processed streaming video data received by at least one of the first viewer and the second viewer, and at least one of the first viewer and the second viewer interactively increases a time delay of an audio presentation of the non-processed streaming audio data until synchronization is achieved.

10. The method of claim 2, wherein the non-processed streaming video data received by at least one of the first viewer and the second viewer precedes the non-processed streaming audio data received by at least one of the first viewer and the second viewer, and at least one of the first viewer and the second viewer interactively increases a time delay of a video presentation of the non-processed streaming video data until synchronization is achieved.

11. The method of claim 2, wherein the non-processed streaming video data received by at least one of the first viewer and the second viewer precedes the non-processed streaming audio data received by at least one of the first viewer and the second viewer, and at least one of the first viewer and the second viewer applies a first step in which the non-processed streaming video data is delayed sufficiently to cause the non-processed streaming audio data to precede the non-processed streaming video data.

12. The method of claim 11, wherein the non-processed streaming audio data received by at least one of the first viewer and the second viewer precedes the non-processed streaming video data received by at least one of the first viewer and the second viewer, and at least one of the first viewer and the second viewer interactively increases a time delay of an audio presentation of the non-processed streaming audio data until synchronization is achieved.

13. The method of claim 1, further comprising enabling the first viewer and the second viewer to communicate with the commentator and with each other during an occurrence of the live event by providing text messaging functionality via the Internet between at least one of the first viewer and the second viewer and the commentator.

14. A method of generating and presenting non-processed streaming audio data and non-processed streaming video data to a multiplicity of viewers, the non-processed streaming video data comprising video data depicted from a live event and the non-processed streaming audio data comprising audio data related to the live event and generated by a commentator, the method comprising:
presenting, via a commercial television unit, the non-processed streaming video data to the commentator and the multiplicity of viewers, wherein a video presentation timing to the commentator may differ from the video presentation timing to each viewer of the multiplicity of viewers;
generating the non-processed streaming audio data related to the live event by the commentator;
transferring the non-processed streaming audio data via an Internet to each viewer of the multiplicity of viewers; and
providing each viewer of the multiplicity of viewers with a capability to synchronize a video presentation of the non-processed streaming video data with an audio presentation of the non-processed streaming audio data, wherein a first viewer of the multiplicity of viewers can directly synchronize the non-processed streaming video data and the non-processed streaming audio data via a first time, and a second viewer of the multiplicity of viewers can directly synchronize the non-processed streaming video data and the non-processed streaming audio data via a second time that is different from the first time.

15. The method of claim 14, wherein the capability to synchronize comprises at least one of electronic circuitry that delays an introduction of the non-processed streaming audio data received by each viewer of the multiplicity of viewers, a software delay that delays the introduction of the non-processed streaming audio data received by each viewer of the multiplicity of viewers, and a video controlled buffer that delays an introduction of the non-processed streaming video data to each viewer of the multiplicity of viewers.

16. The method of claim 15, wherein the video controlled buffer comprises electronic memory connected between a commercial television channel that provides the non-processed streaming video data and the commercial television unit, thereby providing each viewer of the multiplicity of viewers with a capability to interactively delay the non-processed streaming video data to the commercial television unit, by selectively stopping and restarting a flow of the non-processed streaming video data at different times until the non-processed streaming video data and the non-processed streaming audio data are substantially synchronized.

17. The method of claim 14, wherein transferring the non-processed streaming audio data via the Internet is carried out via at least one web site to which both the commentator and each viewer of the multiplicity of viewers are logged in.

18. The method of claim 15, wherein the video controlled buffer comprises a software buffering program embedded in a processor that receives the non-processed streaming video data from a television channel, provides a time delay controlled by each viewer of the multiplicity of viewers, and presents delayed video data to a display unit linked to the processor.

19. The method of claim 18, wherein the processor is also used to delay the audio data.

20. The method of claim 14, further comprising enabling each viewer of the multiplicity of viewers to communicative with the commentator and amongst themselves during an occurrence of the live event by providing text messaging functionality via the Internet between each viewer of the multiplicity of viewers and the commentator.

* * * * *